United States Patent Office

3,371,081
Patented Feb. 27, 1968

3,371,081
PROCESS FOR THE PURIFICATION
OF CYTOCHROME C
Kazuo Nakanishi and Kazuo Motonaga, Tokyo, Japan, assignors to Sankyo Company, Limited, Tokyo, Japan
No Drawing. Filed Aug. 27, 1964, Ser. No. 392,580
Claims priority, application Japan, Aug. 29, 1963,
38/46,036
3 Claims. (Cl. 260—115)

ABSTRACT OF THE DISCLOSURE

Process for the purification of a yeast cytochrome C aqueous solution which comprises (1) treating an aqueous solution of yeast cytochrome C with ammonium sulfate followed by filtration; (2) adding to the filtrate a water-soluble cupric salt followed by dialysis of the resulting solution; (3) reducing the salt concentration of the dialyzate below about $\frac{1}{10}$; (4) treating the diluted dialyzate with a weakly acid ion exchange resin, washing the said resin with a solution of a salt or a buffer solution followed by elution of the resin with a solution of a salt or a buffer solution; and then (5)(a) treating the eluate with sulfite, hydrosulfite or SH-containing compound or (b) treating the eluate with sulfite or hydrosulfite followed by reducing the salt concentration of the eluate below about $\frac{1}{4}$, treating the diluted solution with a weakly acid ion exchange resin, eluting the resin with a solution of a salt or a buffer solution followed by treatment of the eluate with SH-containing compound.

---

This invention relates to a process for the purification of cytochrome C. More particularly, it is concerned with a process for producing highly purified cytochrome C-containing solutions by effecting the purification of cytochrome C aqueous solution, said cytochrome C possessing SH group in the molecule.

Cytochrome C, red pigment protein naturally existing in almost all the organisms, participates in oxidation-reduction reactions in the living organism, and especially in higher animals it plays an indispensable part in the metabolism. Recently, attempts have been made on the clinical application of cytochrome C to diseases considered to be caused by disorder of respiratory oxidation of the cell with favorable results.

Prior to this invention various methods, for example the method described in Japan Patent No. 255,732, were known for the purification of cytochrome C. Most of these methods, however, involved use of the perfect chromatography on a cation exchange resin, completion of which procedure required a very long period of time, and moreover, when eluted gave cytochrome C fractions of low concentrations. Accordingly, it was considered that there was possibility of further improvement for commercial operation of the methods.

An object of this invention, therefore, is to provide a process for the purification of cytochrome C by simple procedures as well as in high yields without the above-mentioned disadvantages accompanied.

Other objects will be apparent from the description of this invention herein below.

In accordance with the present invention, after years of investigation on a commercially advantageous and simply operable method for the purification of cytochrome C, we have now found that highly purified cytochrome C aqueous solutions, said cytochrome C possessing SH group in the molecule, are obtained by (1) treating an aqueous solution of the cytochrome C, obtained by extraction from a source of the cytochrome C such as yeast, for example, yeast of the genus Saccharomyces, with ammonium sulfate added to the solution to give 0.2–0.85 saturation solution (complete saturation being defined as 1.0), followed by filtration; (2) adding to the filtrate a water-soluble cupric salt at a ratio as much as at least 1.0 mole per 1.0 mole of the cytochrome C, followed by dialysis of the resulting solution; (3) treating the dialyzate with a weakly acid ion exchange resin containing as the active group carboxyl group, washing the resin with a solution of a salt selected from the group consisting of ammonium sulfate, sodium chloride, potassium chloride and sodium sulfate or a buffer solution of potassium, sodium or ammonium phosphate, said solution being of cation concentration of 0.2–0.5 mole, followed by elution of the resin with a solution of a salt selected from the group consisting of ammonium sulfate, sodium chloride, potassium chloride and sodium sulfate or a buffer solution of potassium, sodium or ammonium phosphate, said solution being of cation concentration of at least 0.6 mole; (4) and then treating the eluate thus obtained with a sulfite, hydrosulfite or a water-soluble compound possessing SH group in the molecule or with a sulfite or hydrosulfite and subsequently with a water-soluble compound possessing SH group in the molecule.

In carrying out the process of this invention, the step (1) is accomplished by treating an aqueous solution of cytochrome C possessing SH group in the molecule, obtained by extraction from a source of the cytochrome C such as, for example, yeast of the genus Saccharomyces, with ammonium sulfate, followed by filtration. The ammonium sulfate is employed in an amount of about 0.6–0.85 saturation, usually of about 0.8 saturation when perfect saturation is defined as 1.0.

The step (2) is achieved by adding to the filtrate obtained in the step (1) a water-soluble cupric salt at a ratio of at least 1.0 mole, usually 1.0 mole to 50 moles, preferably 1.0 mole to 15 moles per 1 mole of the cytochrome C, followed by dialysis.

The treatment in this step is considered to effect oxidation of SH group in the molecule of cytochrome C, thus producing two molecules of the cytochrome C in the form of S—S bond.

Any cupric salt may be employed in this step so long as it is divalent and water-soluble. However, practically suitable one includes cupric sulfate, nitrate, chloride and acetates. Addition of the cupric salt tends to result in reduction of pH of the solution and it is desirable to maintain pH of the solution neutral or slightly acid with an adequate alkali such as, for example, ammonia. The solution resulted from the treatment with cupric salt is subjected to a procedure such as dialysis or dilution to a salt concentration below about $\frac{1}{10}$ for use in the subsequent step.

The step (3) is accomplished by treating the dialyzate obtained in the step (2) with the ion exchange resin as described above, washing the resin with the salt or buffer solution of cation concentration as described above to remove impurity protein and subsequently treating the resin with the salt or buffer solution of cation concentration as described above to effect elution of cytochrome C.

In this step impurity protein is eluted with the salt or buffer solution of cation concentration of 0.2–0.5 mole from the ion exchange resin, whereas cytochrome C, which has been transformed into the form of S—S bond in the previous step, is hardly eluted with the solution of the above-given cation concentration when adsorbed on the ion exchange resin and remains adsorbed thereon. Treatment of the resin after the elution with a salt or buffer solution of cation concentration of at least 0.7 mole, usually 0.7–1.0 mole, gives rise to elution of cytochrome C in the form of S—S bond to produce an aqueous solution containing said cytochrome C.

The step of treatment with a weakly acid ion exchange resin comprises passing the cytochrome C-containing dialyzate obtained in the above-described step through a weakly acid ion exchange resin being in advance bufferized to be approximately neutral with a suitable buffer solution to adsorb the cytochrome C on said resin. As the weakly acid ion exchange resin used in this step is suitable, for example, Amberlite IRC 50 manufactured and sold by Rohm & Haas Company, U.S.A., or Duolite CS 101 manufactured and sold by Chemical Process Company, U.S.A. The most suitable buffer solution is a ammonium phosphate buffer solution containing about 0.1 mole ammonium ion, but other buffer agents may be used.

The final step, that is, the step (4), is achieved by treating the cytochrome C-containing eluate with a sulfite, hydrosulfite or a water-soluble compound possessing SH group in the molecule or with a sulfite or hydrosulfite and subsequently with a water-soluble compound possessing SH group in the molecule. As examples of sulfite or hydrosulfite that may be used in this step are mentioned sodium and potassium sulfites and sodium and potassium hydrosulfites. Any compound possessing SH group in the molecule, if being soluble in water, may be used in this step as the SH group possessing compound. Typical examples of the compound include cystein, glutathion, mercaptoethanol, BAL and thioglycolic acid. The amount of sulfite, hydrosulfite or water-soluble compound possessing SH group may be sufficient if it is about 1 mole or more per 1 mole of cytochrome C and it is usually desirable to use about 1–15 moles of the compound.

The step of treatment with a sulfite or hydrosulfite and subsequently with a compound possessing SH group is achieved by subjecting the cytochrome C-containing aqueous solution first treated with a sulfite or hydrosulfite to a process such as dialysis or dilution to reduce the salt concentration below about 1/4, treating the resulting solution with an ion exchange resin to adsorb the cytochrome C, eluting the cytochrome C from the resin with a salt or buffer solution of cation concentration of 0.3–1.0 mole and then treating the cytochrome C-containing aqueous solution resulted from the elution with a compound possessing SH group at a ratio more than 5 moles per 1.0 mole of the cytochrome C.

In this step, cleavage of S—S bond in the cytochrome C in the eluate from the previous step, the step (3), is caused by the treatment with a compound possessing SH group to regenerate native cytochrome C possessing SH group. Cleavage of the S—S bond takes place also by the treatment with a sulfite or hydrosulfite, thereby giving both cytochrome C possessing SH group and cytochrome C possessing S—SO$_3^-$ group. The cytochrome C possessing S—SO$_3^-$ group also has cytochrome C-like activities and may be used as it is. However, it is possible to convert the S—SO$_3^-$ group to SH group by treatment with a compound possessing SH group.

If more highly purified cytochrome C-containing aqueous solution of higher concentration is desired, further concentration step well known by the art may be applied, although highly purified cytochrome C-containing aqueous solution can be produced by carrying out the steps described above in details.

As the yeast cytochrome C-containing aqueous solution used as the starting material in the process of this invention may be used any cytochrome C-containing aqueous solution from purification of yeast extract to some extent such as, for example, that obtained by exteracting yeast according to a known method, treating the extract with a resin once or more and then subjecting the resin to salting-out with ammonium sulfate to remove more or less impurity protein.

The following examples are given to illustrate this invention. However, it is to be understood that they are not intended to limit the scope of the invention in any sense.

*Example 1*

To 10 kg. of press yeast of *Saccharomyces oviformis* is added about 1.5 l. of ethyl acetate and the mixture is allowed to stand for an hour, followed by dispersion in 50 l. of water. To the dispersion is added aqueous ammonia to adjust pH to 9.0 and the mixture is allowed to stand for an hour, followed by centrifugal operation to collect the yeast. The yeast thus obtained is then dispersed in 50 l. of water for washing followed by centrifugal separation. The washed yeast is dispersed in 5 l. of 2 M sodium chloride solution and the dispersion is allowed to stand overnight at 10° C. The yeast is then removed by centrifugal separation and the extract thus obtained is subjected to dialysis to a salt concentration about 1/10. The diluted solution is passed through a Duolite CS 101 column to adsorb cytochrome C on the upper part of the column. The Duolite CS 101 used in this procedure has been in advance bufferized with ammonium phosphate-phosphoric acid buffer, pH 7.0, containing 0.1 mole ammonium ion. The resin containing cytochrome C adsorbed thereon is then collected and packed in another column. The column is treated with the above-described buffer solution containing 0.8 mole ammonium ion for elution to give 100 ml. of an aqueous solution containing 1250 mg. of cytochrome C. To the cytochrome C-containing aqueous solution thus obtained is added ammonium sulfate to 0.82 saturation. Precipitates then formed are subjected to suction filtration by the use of hydrosupercel as a filter aid to give 130 ml. of an aqueous solution containing 1090 mg. of cytochrome C.

The cytochrome C-containing aqueous solution thus obtained is diluted with water to about two-times volume. To the diluted solution is added with stirring an aqueous solution of cupric sulfate containing 10 mole cupric sulfate per 1 mole of the cytochrome C in the solution. The resulting solution is allowed to stand for about 2 hours while maintaining pH of the solution 6.5. The solution is then placed in a cellophane and dialyzed overnight against running water to an ammonium sulfate concentration below 1/10.

The diluted solution of cytochrome C thus obtained is passed through a Duolite CS 101 column to adsorb the cytochrome C on the upper part of the column. The Duolite CS 101 has been bufferized in advance with an ammonium phosphate-phosphoric acid buffer, pH 7.0, containing 0.1 mole ammonium ion.

Through the above-described column is passed an ammonium phosphate-phosphoric acid buffer containing 0.35 mole ammonium ion at a ratio of 5 l. per 1 g. of the cytochrome C to effect washing.

After the washing, the cytochrome C-adsorbing portion of the column is collected and packed in another column. Through the column is then passed 0.4 M ammonium sulfate solution to elute the cytochrome C.

To the cytochrome C-containing solution is added sodium sulfite at a ratio of 10 moles per 1 mole of the cytochrome C. The mixture is allowed to stand overnight to give 180 ml. of an aqueous solution containing 980 mg. of highly purified cytochrome C.

*Example 2*

To the cytochrome C-containing eluate product in the step (3) in Example 1 is added mercaptoethanol at a ratio of 10 moles per 1 mole of the cytochrome C and the mixture is allowed to stand overnight to give 180 ml. of an aqueous solution containing 980 mg. of highly purified cytochrome C.

*Example 3*

To the cytochrome C-containing eluate produced in the step (3) in Example 1 is added sodium hydrosulfite at a ratio of 10 moles per 1 mole of the cytochrome C and the mixture is allowed to stand overnight to give 180 ml.

of an aqueous solution containing 980 mg. of highly purified cytochrome C.

*Example 4*

Dialysis against distilled water is made of 180 ml. of the aqueous solution containing 980 mg. of cytochrome C obtained in Example 1 to reduce the concentration of coexisting salt. The resulting cytochrome C-containing aqueous solution is then passed through an Amberlite IRC 50 column to adsorb the cytochrome C on the upper part of the column. The Amberlite IRC 50 used in this procedure has been in advance bufferized with an ammonium phosphate-phosphoric acid buffer, pH 7, containing 0.1 mole ammonium ion. The resin adsorbing the cytochrome C thereon is packed in another column and the column is treated with the above-described buffer solution containing 0.8 mole ammonium ion for elution to give 80 ml. of an aqueous solution containing 930 mg. of cytochrome C. To the cytochrome C-containing aqueous solution thus obtained is added cystein at a ratio of 10 moles per 1 mole of the cytochrome C and the mixture is allowed to stand overnight. Precipitates then formed are removed by filtration and washed with an ammonium phosphate-phosphoric acid buffer containing 0.2 mole ammonium ion. The filtrate and washing are combined to give 100 ml. of an aqueous solution containing 900 mg. of highly purified cytochrome C.

We claim:
1. Process of preparing a highly purified aqueous cytochrome C solution wherein the cytochrome C is derived from yeast and comprses SH in the molecule, which comprises:
   (1) adding ammonium sulfate to an aqueous yeast cytochrome C solution and subjecting the system thus obtained to filtration, said ammonium sulfate being added in an amount to yield a 0.6–0.85 saturated solution, complete saturation being defined as 1.0;
   (2) adding to the filtrate thus obtained a water-soluble cupric salt at a ratio of at least 1.0 mole per mole of cytochrome C and subjecting the resulting solution to dialysis;
   (3) reducing the salt concentration of the dialyzate to a value below about $1/10$;
   (4) passing the diluted dialyzate through a weakly acid ion exchange resin to adsorb the cytochrome C on the resin, the said resin containing carboxyl as the active group and being bufferized to a substantially neutral value, washing the resin with an aqueous solution of a salt selected from the group consisting of ammonium sulfate, sodium chloride, potassium chloride and sodium sulfate or with a buffer solution of potassium phosphate, sodium phosphate or ammonium phosphate, the said solution having a cation concentration of 0.2–0.5 mole and eluting the resin with an aqueous solution of a salt selected from the group consisting of ammonium sulfate, sodium chloride, potassium chloride and sodium sulfate or with a buffer solution of potassium phosphate, sodium phosphate or ammonium phosphate, the said solution having a cation concentration of at least 0.7 mole; and then
   (5) treating the eluate thus obtained with a sulfite, a hydrosulfite or a water-soluble compound possessing SH group in the molecule.

2. A process as claimed in claim 1, wherein the bufferizing of step (4) is effected with a buffer solution of potassium phosphate, sodium phosphate or ammonium phosphate.

3. Process of preparing a highly purified aqueous cytochrome C solution wherein the cytochrome C is derived from yeast and comprises SH in the molecule, which comprises:
   (1) adding ammonium sulfate to an aqueous yeast cytochrome C solution and subjecting the system thus obtained to filtration, said ammonium sulfate being added in an amount to yield a 0.6–0.85 saturated solution, complete saturation being defined as 1.0;
   (2) adding to the filtrate thus obtained a water-soluble cupric salt at a ratio of at least 1.0 mole per mole of cytochrome C and subjecting the resulting solution to dialysis;
   (3) reducing the salt concentration of the dialyzate to a value below about $1/10$;
   (4) passing the diluted dialyzate through a weakly acid ion exchange resin to adsorb the cytochrome C on the resin, the said resin containing carboxyl as the active group and being bufferized to a substantially neutral value, washing the resin with an aqueous solution of a salt selected from the group consisting of ammonium sulfate, sodium chloride, potassium chloride and sodium sulfate or with a buffer solution of potassium phosphate, sodium phosphate or ammonium phosphate, the said solution having a cation concentration of 0.2–0.5 mole and eluting the resin with an aqueous solution of a salt selected from the group consisting of ammonium sulfate, sodium chloride, potassium chloride and sodium sulfate or with a buffer solution of potassium phosphate, sodium phosphate or ammonium phosphate, the said solution having a cation concentration of at least 0.7 mole; and then
   (5) treating the eluate thus obtained with a sulfite or a hydrosulfite, reducing the salt concentration of the treated eluate below about $1/4$, treating the diluted solution with a weakly acid ion exchange resin possessing carboxyl as the active group, eluting the resin with an aqueous solution of a salt selected from the group consisting of ammonium sulfate, sodium chloride, potassium chloride and sodium sulfate or with a buffer solution of potassium phosphate, sodium phosphate or ammonium phosphate, the said solution having a cation concentration of 0.3–1.0 mole and then treating the resulting solution with a compound possessing SH group in the molecule.

References Cited

Advances in Protein Chemistry, vol. 21, 1966, pages 137–142 and 147–151, Margoliash et al.

WILLIAM H. SHORT, *Primary Examiner.*

H. E. SCHAIN, *Assistant Examiner.*